(12) United States Patent
Wang et al.

(10) Patent No.: US 11,953,690 B2
(45) Date of Patent: Apr. 9, 2024

(54) HEAD-MOUNTABLE DEVICE AND CONNECTOR

(71) Applicant: Apple Inc., Cupertino, CA (US)

(72) Inventors: Forrest C. Wang, Petaluma, CA (US); Ritu Shah, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/122,058

(22) Filed: Mar. 15, 2023

(65) Prior Publication Data

US 2023/0228999 A1 Jul. 20, 2023

Related U.S. Application Data

(63) Continuation of application No. PCT/US2021/046671, filed on Aug. 19, 2021.

(60) Provisional application No. 63/078,814, filed on Sep. 15, 2020.

(51) Int. Cl.
  *G02B 27/01* (2006.01)
  *G02B 27/00* (2006.01)
  *G06F 3/14* (2006.01)

(52) U.S. Cl.
  CPC ..... *G02B 27/0172* (2013.01); *G02B 27/0093* (2013.01); *G06F 3/1407* (2013.01); *G02B 2027/0138* (2013.01); *G02B 2027/014* (2013.01); *G02B 2027/0169* (2013.01)

(58) Field of Classification Search
  CPC ............ G02B 27/0172; G02B 27/0093; G02B 2027/0138; G02B 2027/014; G02B 2027/0169; G06F 3/1407
  USPC .......................................................... 345/8
  See application file for complete search history.

(56) References Cited

U.S. PATENT DOCUMENTS

| | | | |
|---|---|---|---|
| 10,373,342 B1 | 8/2019 | Perez, III et al. | |
| 10,438,719 B1* | 10/2019 | Wang | H01B 7/009 |
| 2014/0184496 A1* | 7/2014 | Gribetz | G06F 3/0482 |
| | | | 345/156 |
| 2015/0193187 A1* | 7/2015 | Kimn | G09G 5/006 |
| | | | 345/1.2 |
| 2015/0301592 A1 | 10/2015 | Miller | |
| 2020/0073126 A1* | 3/2020 | Grobecker | G06T 11/00 |

(Continued)

FOREIGN PATENT DOCUMENTS

| | | | | |
|---|---|---|---|---|
| JP | 2012160898 A | * | 8/2012 | .......... G02B 27/017 |
| WO | WO 2012/105499 | | 8/2012 | |
| WO | WO 2019/185173 | | 10/2019 | |

OTHER PUBLICATIONS

International Search Report and Written Opinion from PCT/US2021/046671, dated Dec. 3, 2021, 16 pages.

*Primary Examiner* — Mark Edwards
(74) *Attorney, Agent, or Firm* — BAKERHOSTETLER

(57) ABSTRACT

Multiple head-mounted devices and/or other electronic devices can operate in concert to provide multiple users with shared experiences and content enjoyment. Such operations can be facilitated by a connection between multiple head-mounted devices and/or other electronic devices to allow different users to receive content. Such a connection can be made possible by a connector that directly and physically connects head-mounted devices and/or other electronic devices to each other and transmits signals there between. By providing a physical connection, the signals can be efficiently transmitted even when other types of connections (e.g., wireless) are not available.

16 Claims, 7 Drawing Sheets

(56) References Cited

U.S. PATENT DOCUMENTS

2020/0201515 A1* 6/2020 Moon ................... G06F 3/017
2020/0286207 A1* 9/2020 Michihata ............ G06F 3/1431

* cited by examiner

HEAD-MOUNTABLE DEVICE AND CONNECTOR

CROSS-REFERENCE TO RELATED APPLICATIONS

This application is a continuation of International Application No. PCT/US2021/046671, entitled "HEAD-MOUNTABLE DEVICE AND CONNECTOR," filed Aug. 19, 2021, which claims the benefit of U.S. Provisional Application No. 63/078,814, entitled "HEAD-MOUNTABLE DEVICE AND CONNECTOR," filed Sep. 15, 2020, the entirety of which is incorporated herein by reference.

TECHNICAL FIELD

The present description relates generally to head-mountable devices, and, more particularly, to head-mountable devices for use with a connector.

BACKGROUND

A head-mountable device can be worn by a user to display visual information within the field of view of the user. The head-mountable device can be used as a virtual reality (VR) system, an augmented reality (AR) system, and/or a mixed reality (MR) system. A user may observe outputs provided by the head-mountable device, such as visual information provided on a display. The display can optionally allow a user to observe an environment outside of the head-mountable device. Other outputs provided by the head-mountable device can include speaker output and/or haptic feedback. A user may further interact with the head-mountable device by providing inputs for processing by one or more components of the head-mountable device. For example, the user can provide tactile inputs, voice commands, and other inputs while the device is mounted to the user's head.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

Head-mountable devices, such as head-mountable displays, headsets, visors, smartglasses, head-up display, etc., can perform a range of functions that are managed by the components (e.g., sensors, circuitry, and other hardware) included with the wearable device.

Multiple head-mounted devices can operate in concert to provide multiple users with shared experiences and content enjoyment. Such operations can be facilitated by a connection between multiple head-mounted devices and/or other electronic devices to allow different users to receive content. Such a connection can be made possible by a connector that directly and physically connects head-mounted devices and/or other electronic devices to each other and transmits signals there between. By providing a physical connection, the signals can be efficiently transmitted even when other types of connections (e.g., wireless) are not available.

The burden of processing can be shared between multiple devices and/or delegated to a designated device. At least some content provided for output on one device can be transmitted to another device for output thereat. The connection can facilitate such transmission in a manner that reduces the burden of generating content and/or adapting content for output on any given device. The distribution and/or focus of workload and sharing of processed information can lead to greatly improved power management and heat generation at one or more of the devices.

These and other embodiments are discussed below with reference to FIGS. 1-11. However, those skilled in the art will readily appreciate that the detailed description given herein with respect to these Figures is for explanatory purposes only and should not be construed as limiting.

Figure 1:
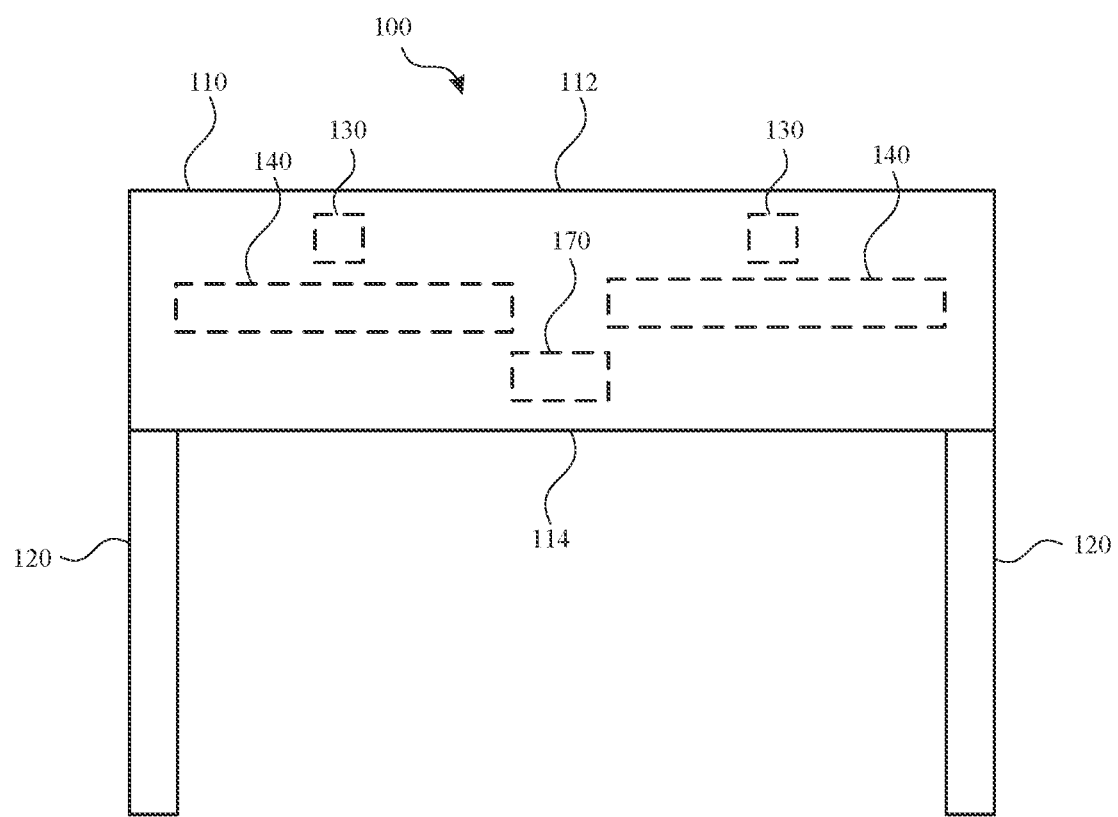
FIG. 1 illustrates a top view of a head-mountable device, according to some embodiments of the present disclosure.

As shown in FIG. 1, a head-mountable device 100 can include a frame 110 and a head securement element 120. The frame 110 can be worn on a head of a user. The frame 110 can be positioned in front of the eyes of a user to provide information within a field of view of the user. The frame 110 can optionally provide a nosepiece to rest on a user's nose and/or other face engagement portions to rest against the user's face.

The frame 110 can be supported on a user's head with a head securement element 120. The head securement element 120 can wrap or extend along opposing sides of a user's head and/or to a rear of the user's head. The head securement element 120 can optionally include earpieces for wrapping around or otherwise engaging or resting on a user's ears. It will be appreciated that other configurations can be applied for securing the head-mountable device 100 to a user's head. For example, one or more bands, straps, belts, caps, hats, or other components can be used in addition to or in place of the illustrated components of the head-mountable device 100.

The frame 110 can provide structure around a peripheral region thereof to support any internal components of the head-mountable device 100 in their assembled position. For example, the frame 110 can enclose and support various internal components (including for example integrated circuit chips, processors, memory devices and other circuitry) to provide computing and functional operations for the head-mountable device 100, as discussed further herein. While several components are shown within the frame 110 of the head-mountable device 100, it will be understood that some or all of these components can be located anywhere within or on the head-mountable device 100f. For example, one or more of these components can be positioned within the face engagement module 180, the arms 190, and/or the head securement element 120 of the head-mountable device 100.

The head-mountable device 100 can include and/or support one or more camera modules 130. The camera modules 130 can be positioned on or near an outer side 112 of the frame 110 to capture images of views external to the head-mountable device 100. As used herein, an outer side of a portion of a head-mountable device is a side that faces away from the user and/or towards an external environment. The captured images can be used for display to the user or stored for any other purpose. Each of the camera modules 130 can be movable along the outer side 112. For example, a track or other guide can be provided for facilitating movement of the camera module 130 therein.

The head-mountable device 100 can include display elements 140 that provide visual output for viewing by a user wearing the head-mountable device 100. One or more display elements 140 can be positioned on or near an inner side 114 of the frame 110. As used herein, an inner side 114 of a portion of a head-mountable device 100 is a side that faces toward the user and/or away from the external environment.

A display element 140 can transmit light from a physical environment (e.g., as captured by a camera module) for viewing by the user. Such a display element 140 can include optical properties, such as lenses for vision correction based on incoming light from the physical environment. Additionally or alternatively, a display element 140 can provide information as a display within a field of view of the user. Such information can be provided to the exclusion of a view of a physical environment or in addition to (e.g., overlaid with) a physical environment.

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations, (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality.

A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head-mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mountable system may have one or more speaker(s) and an integrated opaque display. Alternatively, a head-mountable system may be configured to accept an external opaque display (e.g., a smartphone). The head-mountable system may incorporate one or more imaging sensors to capture images or video of the physical environment, and/or one or more microphones to capture audio of the physical environment. Rather than an opaque display, a head-mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Each display element 140 can be adjusted to align with a corresponding eye of the user. For example, each display element 140 can be moved along one or more axes until a center of each display element 140 is aligned with a center of the corresponding eye. Accordingly, the distance between the display elements 140 can be set and/or changed based on an interpupillary distance ("IPD") of the user. IPD is defined as the distance between the centers of the pupils of a user's eyes.

The frame 110 and/or the face engagement module 180 can include a sensor 170. The sensor 170 can be positioned and arranged to detect a characteristic of the user, such as facial features. For example, such a user sensor can perform facial feature detection, facial movement detection, facial recognition, eye tracking, user mood detection, user emotion detection, voice detection, and the like. By further example, the sensor 170 can include an IMU, a depth sensor, a user input component (e.g., touch sensor, crown, touchpad, button, microphone, and the like).

An eye-tracking sensor can track features of the user wearing the head-mountable device 100, including conditions of the user's eye (e.g., focal distance, pupil size, etc.). For example, an eye sensor can optically capture a view of an eye (e.g., pupil) and determine a direction of a gaze of the user. Such eye tracking may be used to determine a location and/or direction of interest with respect to the display element 140 and/or elements presented thereon. Such information can be used as the basis of outputs for the head-mountable device 100 and/or another device, as described herein.

For example, user interface elements can then be provided on the display element 140 of the head-mountable device 100 and/or another device based on this information, for example in a region along the direction of the user's gaze or a region other than the current gaze direction, as described further herein. The detections made by the eye-tracking sensor can determine user actions that are interpreted as user inputs. Such user inputs can be used alone or in combination with other user inputs to perform certain actions. By further example, such sensors can perform facial feature detection, facial movement detection, facial recognition, user mood detection, user emotion detection, voice detection, and the like.

Figure 2:
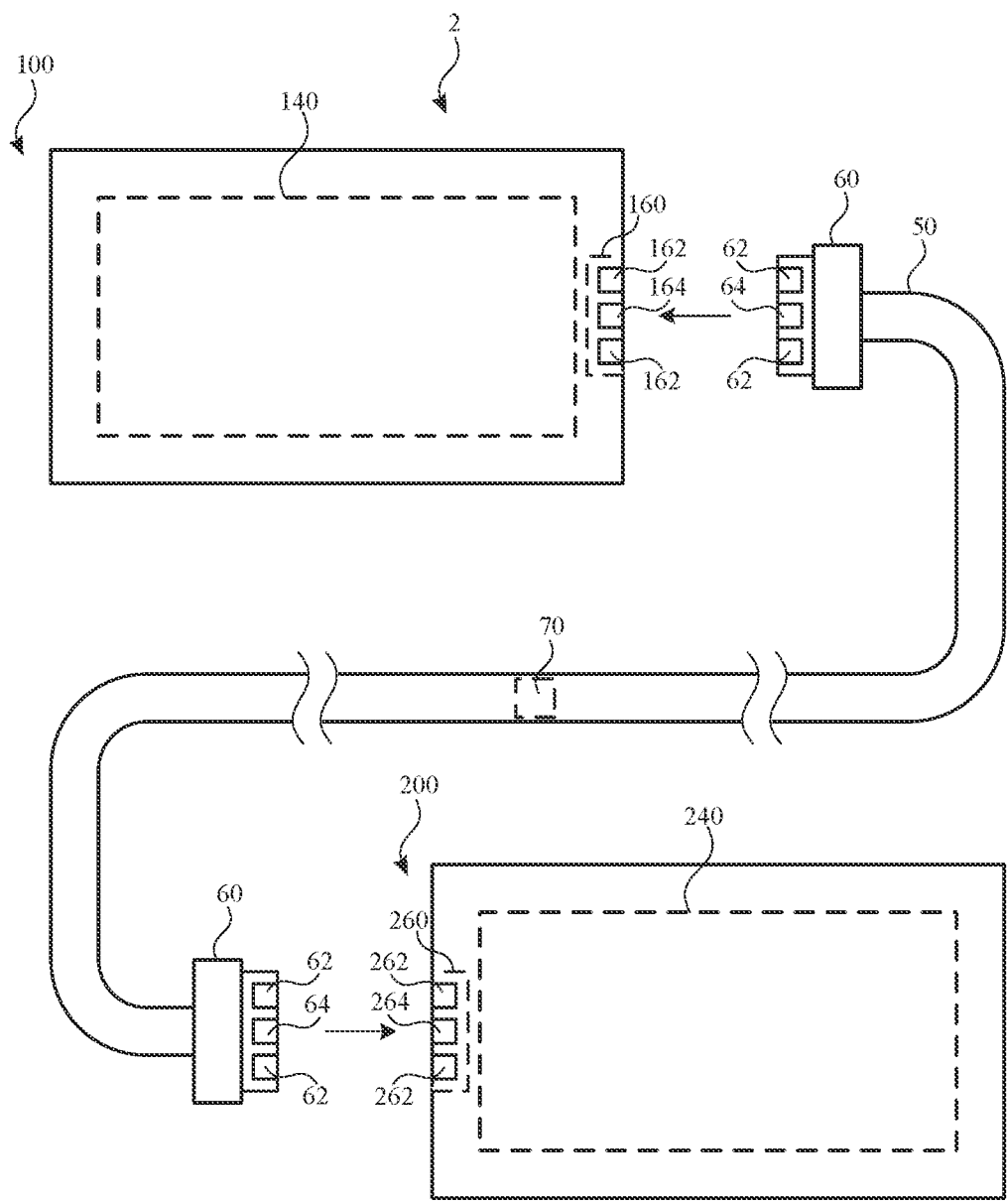
FIG. 2 illustrates a rear view of head-mountable devices and a connector for operably connecting the head-mountable devices to each other, according to some embodiments of the present disclosure.

Referring now to FIG. 2, a connector can be provided to facilitate communication between multiple devices. As shown in FIG. 2, a system 2 can include a first electronic device (e.g., head-mountable device 100) and a second electronic device (e.g., head-mountable device 200 or another electronic device). It will be understood that the first electronic device and/or the second electronic device can be a head-mountable device and/or another electronic device. As such, while reference is made to head-mountable devices, the description provided herein can be applied to other electronic devices.

The system 2 can include a connector 50 that is configured to be operably connected to each of multiple electronic devices (e.g., head-mountable device 100 and head-mountable device 200). For example, the connector 50 can include two or more end portions 60 that each include mechanisms for facilitating attachment to and communication with each of multiple electronic devices.

Each end portion 60 of the connector 50 can include one or more attachment elements 62 configured to facilitate mechanical coupling or connection of the connector 50 and the corresponding head-mountable device by engaging complementary attachment elements 162 or 262 of the corresponding head-mountable device. The attachment elements 62, 162, and/or 262 can include protrusions, grooves, locks, latches, snaps, screws, clasps, threads, magnets, and/or pins for securely attaching the selected end portion 60 of the connector 50 to the corresponding connection port 160 or 260 of the corresponding head-mountable device.

Each end portion 60 of the connector 50 can include one or more communication interfaces 64 that facilitate a communication link between the connector 50 and the corresponding head-mountable device. The communication interfaces 64 can include one or more of a variety of features, such as electrical connectors, pogo pins, conductive surfaces, wireless receivers/transmitters, and/or inductive coupling features (e.g., coils) for communicably coupling to the communication interfaces 164 or 264 of the corresponding head-mountable device. The communication interfaces 64, 164, and/or 264 can include pairs of conductive contacts that are configured to make electrical contact when the end portions 60 and the connection ports 160 and/or 260 are engaged with each other. For example, one or more of the communication interfaces 64, 164, and/or 264 can include a moveable element for making an electrical connection, such as a pogo pin that is at least partially collapsible and/or a contact pad that is at least partially flexible. By further example, a pogo pin can be spring loaded and/or a contact pad can be formed from an electrically conductive foam or elastomer.

While separate, the head-mountable device 100 and the head-mountable device 200 can each be operated independently, for example while worn by separate users. While connected by the connector 50, the head-mountable device 100 and the head-mountable device 200 can communicate with each other and be operated in concert. Accordingly, signals can be transmitted and received by each of the head-mountable device 100 and the head-mountable device 200 via the connector 50.

The connector 50 can facilitate direct connections between devices. For example, the connector 50 can include conductive wires that transmit unmodified signals between devices, such that the signals are received at a destination device substantially as transmitted from a source device.

In some embodiments, the connector 50 can include a controller 70 configured to modify and/or otherwise control a signal transmitted via the connector 50 between devices. For example, the controller 70 can be configured to modify a signal from one device so that the resulting modified signal is one that is more readily utilized by the destination device.

Signals shared between the devices connected by the connector 50 can be related to outputs provided by both of the devices. For example, the head-mountable device 100 can be operated to provide an output at the display element 140 thereof, and the head-mountable device 100 can output a signal via the connector 50 to the head-mountable device 200 so the head-mountable device 200 can provide a related output at the display element 240 thereof. The signal transmitted via the connector 50 can be identical to or similar to the signal used to operate the display element 140. Accordingly, the head-mountable device 100 can output the signal with minimal additional processing.

By further example, the head-mountable device 200 can provide a display element 240 with different characteristics in the display element 140 of the head-mountable device 100. For example, the display element 240 can have a resolution, operating frame rate, and/or other characteristic that differs with respect to the display element 140 of the head-mountable device 100. Accordingly, the signal transmitted from the head-mountable device 100 to the connector 50 may require modification to suit the display element 240 of the head-mountable device 200.

In some embodiments, the controller 70 of the connector 50 can be configured to perform one or more modifications to signals received thereat. For example, the controller 70 can perform sample-rate conversion. Examples of such operations can include sampling-frequency conversion, resampling, upsampling, downsampling, interpolation, decimation, upscaling, downscaling, and the like. The controller 70 of the connector 50 can determine the parameters of such signal modification based on detected characteristics of the head-mountable devices (e.g., of the displays thereof). For example, the controller 70 of the connector 50 can detect one or more characteristics of the display element 140 and/or the display element 240 while connected to the corresponding connection port. The controller 70 can then determine whether and/or which modification to a signal is appropriate. Such a modification can be applied based on the source and destination of the signal. Accordingly, the connector 50 can reduce the need for the transmitting and/or receiving devices to modify the signal transmitted there between, thereby reducing processing loads on the connected devices.

While signals can be related to output provided by the display elements 140 and/or 240, it will be understood that the same or different signals transmitted by the connector 50 can relate to other content shared between the head-mountable devices. For example, the connector 50 can transmit signals relating to other outputs provided by the devices, such as sound, haptic feedback, and the like. The connector 50 can transmit signals between devices without necessarily requiring related output to be provided.

The controller 70 can be integrated into the connector 50. For example, as shown in FIG. 2, the controller 70 can be positioned between end portions 60 of the connector 50. Accordingly, signals received at one end portion 60 can be transmitted via the controller 70, which may operate on the signal as described herein before transmitting a modified signal to another end portion 60. The controller 70 can include one or more processing units that include or are configured to access a memory having instructions stored thereon. The controller 70 can be implemented as any electronic device capable of processing, receiving, or transmitting signals, data, and/or instructions. For example, the controller 70 may include one or more of: a microprocessor, a central processing unit (CPU), an application-specific integrated circuit (ASIC), a digital signal processor (DSP), or combinations of such devices.

The controller 70 and/or other components of the connector 50 can be operated based on power drawn from one or more devices to which the connector 50 is connected. Additionally or alternatively, the connector 50 can include its own power source (e.g., battery, etc.) and/or connect to another power source (e.g., power outlet, etc.).

While two head-mountable devices are illustrated in FIG. 2, it will be understood that a connector 50 can connect to any number of head-mountable devices and/or other electronic devices. For example, a connector 50 can have three or more end portions 60 for operably connecting three or more head-mountable devices and/or other electronic devices to each other. In such an arrangement, any one of the devices can transmit signals to any other device(s), and any one of the devices can receive signals from any other device(s).

Referring now to FIGS. 3-6, two or more head-mountable devices can be operated in concert while connected to each other by a connector. The operations of each head-mountable device can provide outputs to each of the users wearing the head-mountable devices.

Figure 3:
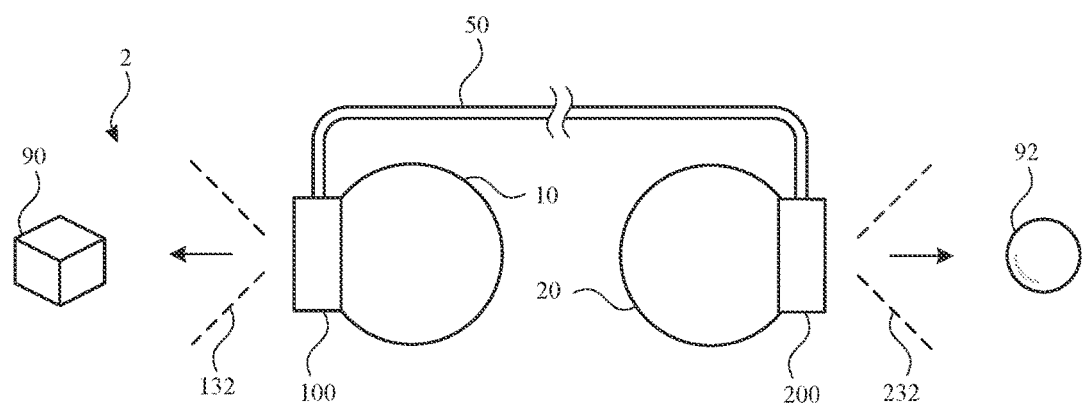
FIG. 3 illustrates a top view of head-mountable devices connected to each other and being worn by separate users, according to some embodiments of the present disclosure.

As shown in FIG. 3, the first user 10 can wear and operate a first head-mountable device 100, and a second user 20 can wear and operate a second head-mountable device 200. The first head-mountable device 100 and the second head-mountable device 200 can be connected to each other by the connector 50, as described herein. The head-mountable devices can be independently operated by each user. For example, the first user 10 can direct the first head-mountable device 100 to capture an image of a field-of-view 132 that can include a first object 90. By further example, the second user 20 can direct the second head-mountable device 200 to capture an image of a field-of-view 232 that can include a second object 92.

Figure 4:
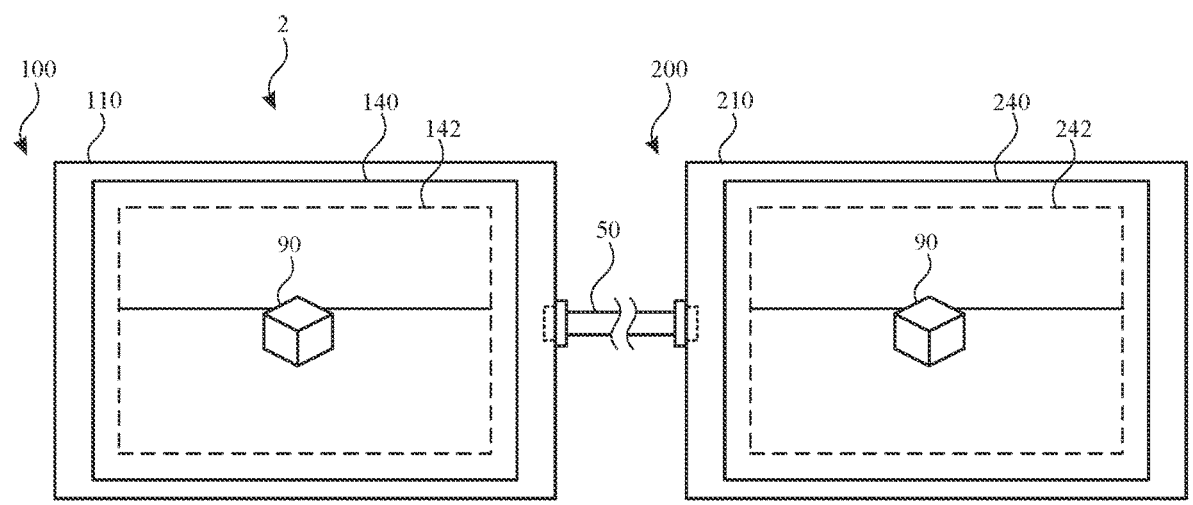
FIG. 4 illustrates a rear view of the head-mountable devices of FIG. 3, each providing a user interface, according to some embodiments of the present disclosure.

Referring now to FIG. 4, the head-mountable devices can share outputs so that each of the users are presented with related content. The content can be at least partially based on the same source of generated content.

FIG. 4 illustrates a rear view of the first head-mountable device 100 providing the display 140 with a first user interface 142 and the second head-mountable device 200 providing the display 240 with a second user interface 242. Not all of the depicted graphical elements may be used in all implementations, however, and one or more implementations may include additional or different graphical elements than those shown in the figure. Variations in the arrangement and type of the graphical elements may be made without departing from the spirit or scope of the claims as set forth herein. Additional components, different components, or fewer components may be provided.

The first user interface 142 and the second user interface 242 can include a depiction of a visual feature. Optionally, the visual feature can include an image of the object 90 captured by a camera of the head-mountable device 100 or another object, such as media content, a video, an image, a virtual object, a menu, text, and the like. In some embodiments, the user interfaces 142 and 242 can have common elements due to a selection of one of the head-mountable devices as a provider of content to both of the users. Such content can include, for example, visual features, audio, haptic feedback, and the like.

It will be understood that, despite common elements provided in both of the user interfaces 142 and 242, the head-mountable devices 100 and 200 can be independently operated by the corresponding users in a manner that allows each user to adjust the view by moving and/or rotating the corresponding head-mountable device. As such, a common set of content elements (e.g., an environment) can be independently experienced according to independent user actions. Additionally or alternatively, one user interface can be a duplication of the other, such that both users receive the same content.

Where one of the head-mountable devices provides content to both, the other head-mountable device can be relieved of some processing load to generate content to output. In particular, where the connector 50 modifies signals from a source, the destination may receive modified signals that are readily provided as outputs to the corresponding user.

Figure 5:
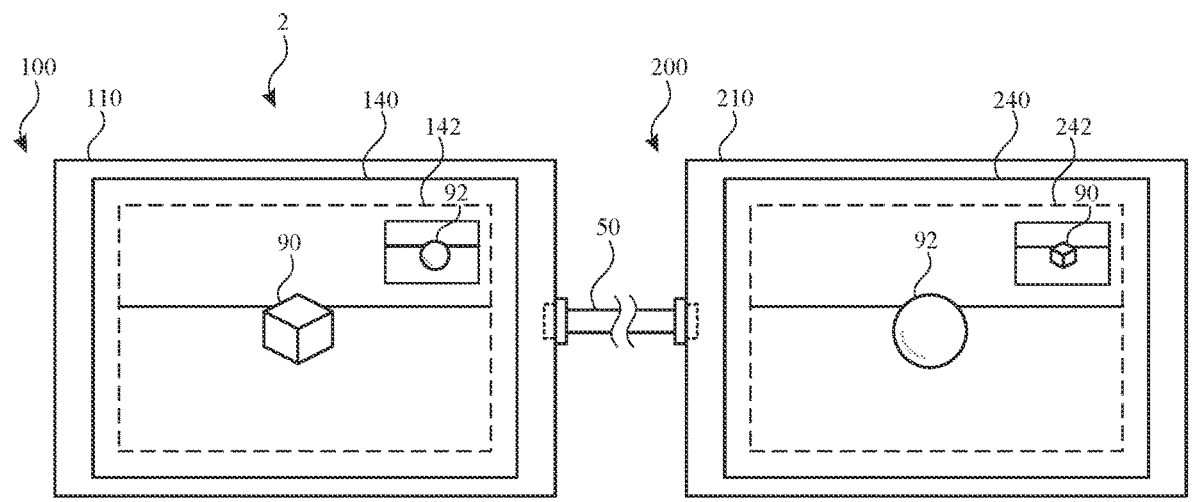
FIG. 5 illustrates a rear view of the head-mountable devices of FIG. 3, each providing a user interface, according to some embodiments of the present disclosure.
Figure 6:
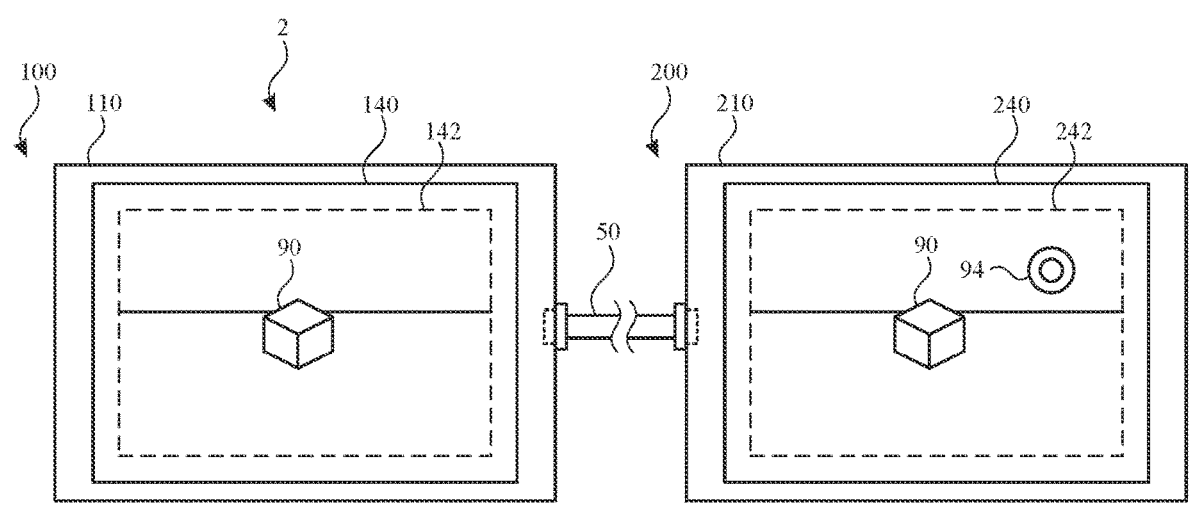
FIG. 6 illustrates a rear view of the head-mountable devices of FIG. 3, each providing a user interface, according to some embodiments of the present disclosure.

Referring now to FIGS. 5 and 6, the head-mountable devices can each provide outputs that are at least partially based on signals transmitted from another head-mountable device. The operations, detections, and/or inputs received by each of the head-mountable devices can optionally affect how the other device performs.

FIGS. 5 and 6 illustrate other rear views of the first head-mountable device 100 providing the display 140 with a first user interface 142 and the second head-mountable device 200 providing the display 240 with a second user interface 242. Not all of the depicted graphical elements may be used in all implementations, however, and one or more implementations may include additional or different graphical elements than those shown in the figures. Variations in the arrangement and type of the graphical elements may be made without departing from the spirit or scope of the claims as set forth herein. Additional components, different components, or fewer components may be provided.

One or more of the head-mountable devices can present content based on the operations of multiple head-mountable devices. For example, as shown in FIG. 5, the first user interface 142 can include an image of the object 90 captured by a camera of the first head-mountable device 100 as well as an image of the second object 92 captured by the camera of the second head-mountable device 200. Similarly, the second user interface 242 can include an image of the second object 92 captured by a camera of the second head-mountable device 200 as well as an image of the first object 90 captured by the camera of the first head-mountable device 100. Such images can be presented simultaneously and/or in sequence. It will be understood that the presented content is not limited to images captured by cameras. Rather, the content can additionally or alternatively include content from either or both devices, including media content, a video, an image, a virtual object, a menu, text, and the like.

As shown in FIG. 6, the first user interface 142 can include an image of the object 90 captured by a camera of the first head-mountable device 100 and/or other content. The second user interface 242 can also include content that is related to the content of the first user interface 142 (e.g., the image of the first object 90). Optionally, additional content can be provided on one of the head-mountable devices. For example, a visual feature 94 can be provided on the second user interface 242 to indicate to the second user a condition relating to the first user. For example, the first user can be providing an input or otherwise performing a detectable action. By further example, the first user may be gazing in a direction (e.g., at a target of the first user's attention), which can be detected by the eye-tracking sensor of the first head-mountable device 100. Such additional information about the first user's operation of the first head-mountable device 100 can be communicated via the connector 50 and provided as an output to the second user via the second head-mountable device 200 (e.g., as visual feature 94). It will be understood that such outputs can include visual features, audio, haptic feedback, and the like.

Figure 7:
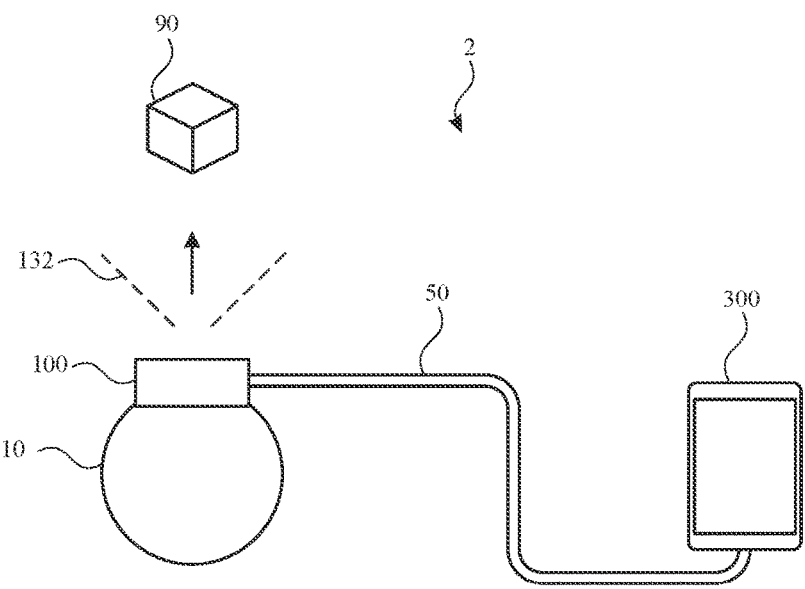
FIG. 7 illustrates a top view of head-mountable device and an electronic device connected to each other, according to some embodiments of the present disclosure.

Referring now to FIG. 7, a head-mountable device can be operated in concert with another electronic device connected to the head-mountable device by a connector. The operations of the head-mountable device and/or the electronic device can provide outputs to each of the users operating the corresponding devices.

As shown in FIG. 3, the first user 10 can wear and operate a first head-mountable device 100, and a second user 20 can wear and operate a second head-mountable device 200. The first head-mountable device 100 and the second head-mountable device 200 can be connected to each other by the connector 50, as described herein. The head-mountable devices can be independently operated by each user. For example, the first user 10 can direct the first head-mountable device 100 to capture an image of a field-of-view 132 that can include a first object 90. By further example, the second user 20 can direct the second head-mountable device 200 to capture an image of a field-of-view 232 that can include a second object 92.

Figure 8:
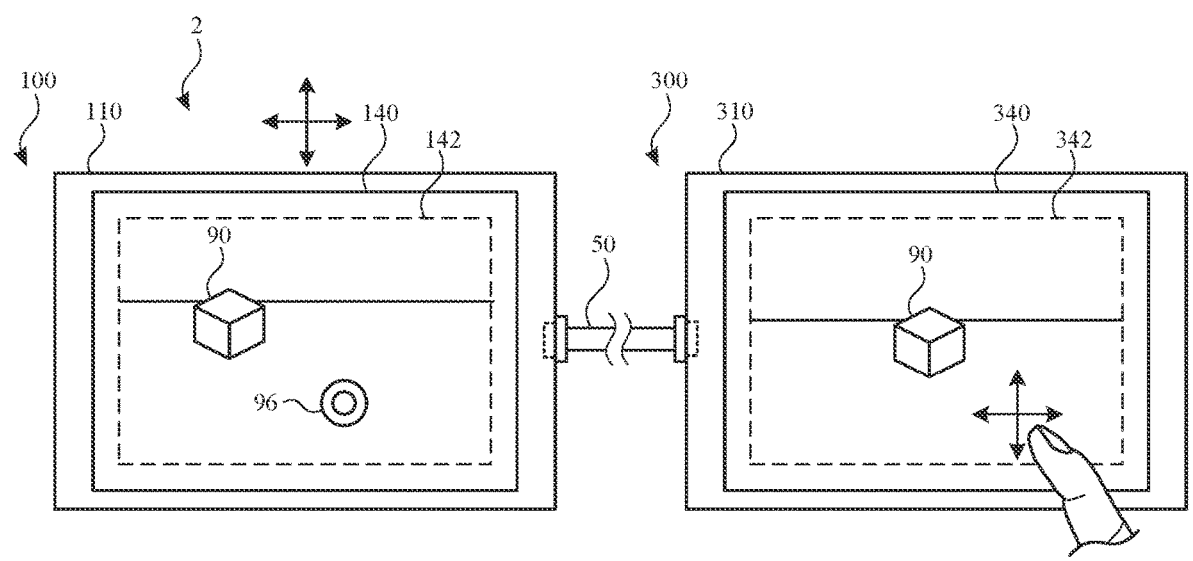
FIG. 8 illustrates a rear view of the head-mountable device and the electronic device of FIG. 7, each providing a user interface, according to some embodiments of the present disclosure.

Referring now to FIGS. 7 and 8, the head-mountable devices can share outputs so that each of the users are presented with related content. The content can be at least partially based on the same source of generated content.

As shown in FIG. 7, a first user 10 can wear and operate a head-mountable device 100, and another user (not shown) can operate an electronic device 300. The electronic device can include a tablet, a phone, a laptop computing device, a desktop computing device, a wearable device, a mobile computing device, a tablet computing device, a display, a television, a digital media player, a head-mountable device, and/or any other electronic device. The head-mountable device 100 and the electronic device 300 can be connected to each other by the connector 50, as described herein. The head-mountable device 100 and the electronic device 300 can be independently operated by each user. For example, the first user 10 can direct the head-mountable device 100 to capture an image of a field-of-view 132 that can include an object 90.

FIG. 8 illustrates a rear view of the head-mountable device 100 providing the display 140 with a first user interface 142 and the electronic device 300 providing the display 340 with a second user interface 342. Not all of the depicted graphical elements may be used in all implementations, however, and one or more implementations may include additional or different graphical elements than those shown in the figure. Variations in the arrangement and type of the graphical elements may be made without departing from the spirit or scope of the claims as set forth herein. Additional components, different components, or fewer components may be provided.

As shown in FIG. 8, the first user interface 142 can include an image of the object 90 captured by a camera of the head-mountable device 100 and/or other content. The second user interface 342 can also include content that is related to the content of the first user interface 142 (e.g., the image of the object 90).

Optionally, additional content can be provided on one or both of the devices. For example, a visual feature 96 can be provided on the first user interface 142 to indicate to the first user a condition relating to the second user. For example, the second user can be providing an input or otherwise performing a detectable action. By further example, the second user may be operating a touch sensor of the electronic device 300 to interact with therewith and/or otherwise provide an indication of an item or area of interest. Such additional information about the second user's operation of the electronic device 300 can be communicated via the connector 50 and provided as an output to the first user via the head-mountable device 100 (e.g., as visual feature 96). It will be understood that such outputs can include visual features, audio, haptic feedback, and the like.

It will be understood that, despite common elements provided in both of the user interfaces 142 and 342, the head-mountable device 100 and the electronic device 300 can be independently operated by the corresponding users in a manner that allows each user to adjust the view by moving and/or rotating the head-mountable device 100 and/or scrolling (e.g., via touch input) on the display element 340 of the electronic device 300. As such, a common set of content elements (e.g., an environment) can be independently experienced according to independent user actions. Additionally or alternatively, one user interface can be a duplication of the other, such that both users receive the same content.

Figure 9:
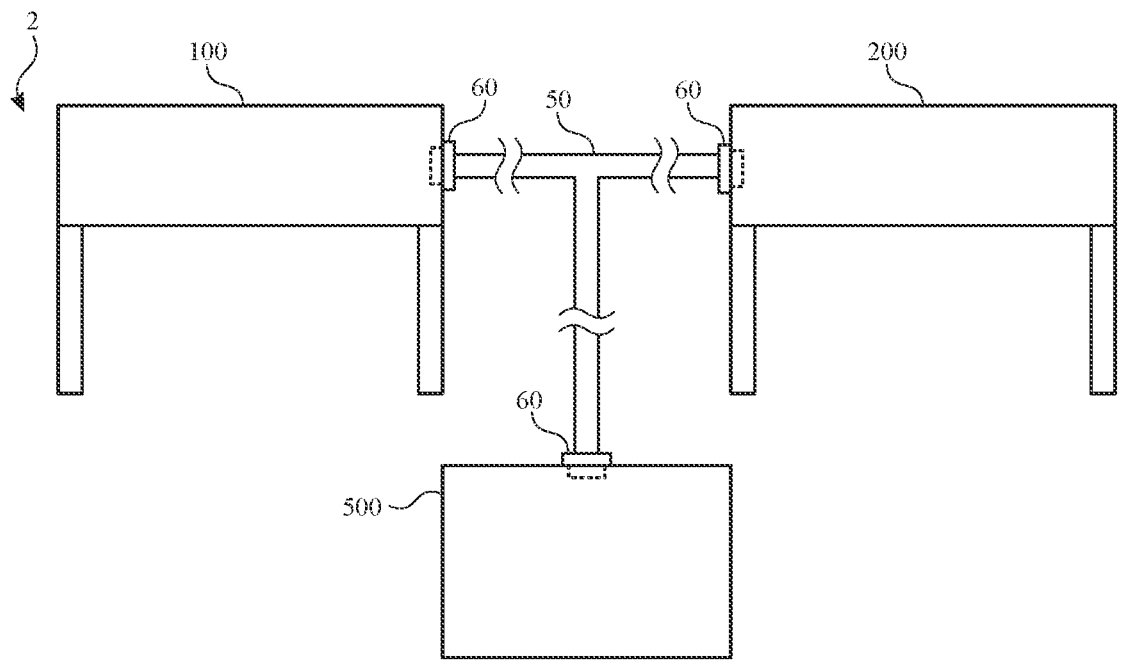
FIG. 9 illustrates a rear view of head-mountable devices and an external device operably connected to each other by a connector, according to some embodiments of the present disclosure.
Figure 10:
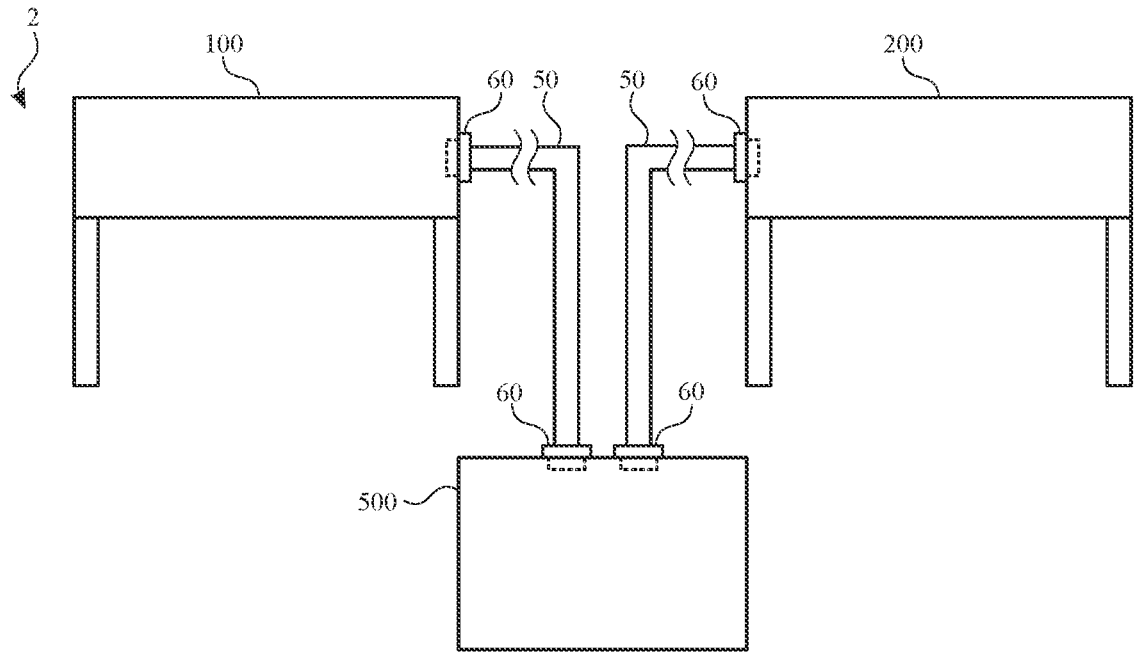
FIG. 10 illustrates a rear view of head-mountable devices and an external device operably connected to each other by a connector, according to some embodiments of the present disclosure.

Referring now to FIGS. 9 and 10, an external device can facilitate connection between multiple head-mountable devices and/or other electronic devices. One or more connectors can be provided to facilitate communication among the devices.

As shown in FIG. 9, a system 2 can include a first electronic device (e.g., head-mountable device 100) and a second electronic device (e.g., head-mountable device 200 or another electronic device). It will be understood that the first electronic device and/or the second electronic device can be a head-mountable device and/or another electronic device. As such, while reference is made to head-mountable devices, the description provided herein can be applied to other electronic devices.

The system 2 can include a connector 50 that is configured to be operably connected to each of multiple electronic devices (e.g., head-mountable device 100 and head-mountable device 200) and to an external device 500. For example, the connector 50 can include at least three end portions 60 that each include mechanisms for facilitating attachment to and communication with each of multiple electronic devices.

While connected by the connector 50 to the external device 500, the head-mountable device 100 and the head-mountable device 200 can communicate with each other and be operated in concert. Accordingly, signals can be transmitted and received by each of the head-mountable device 100, the head-mountable device 200, and the external device 500 via the connector 50. As shown in FIG. 9, a single connector 50 can provide as many end portions 60 as are desired to connect to the devices.

Signals shared between the devices connected by the connector 50 can be related to outputs provided by the devices operated by users. For example, the external device 500 can be operated to transmit signals to provide outputs at each of the head-mountable devices or other electronic devices. By further example, the external device 500 can be operated to receive signals from one or more of the head-mountable devices or other electronic devices and transmit the signal or a modified signal to another one or more of the head-mountable devices or other electronic devices.

In some embodiments, the external device 500 can perform one or more operations described herein with respect to a connector 50 and/or the controller thereof (e.g., sample-rate conversion). Accordingly, the external device 500 can reduce the need for the transmitting and/or receiving devices to modify the signal transmitted there between, thereby reducing processing loads on the connected devices.

The external device 500 can be operated based on power drawn from one or more devices to which the connector 50 is connected. Additionally or alternatively, the external device 500 can include its own power source (e.g., battery, etc.) and/or connect to another power source (e.g., power outlet, etc.).

While two head-mountable devices are illustrated in FIG. 9, it will be understood that a connector 50 can connect to any number of head-mountable devices and/or other electronic devices. For example, a connector 50 can have three or more end portions 60 for operably connecting two or more head-mountable devices and/or other electronic devices and the external device 500. In such an arrangement, any one of the devices can transmit signals to any other device(s), and any one of the devices can receive signals from any other device(s).

As shown in FIG. 10, a system 2 can include a first electronic device (e.g., head-mountable device 100) connected to the external device 500 via a connector 50 and a second electronic device (e.g., head-mountable device 200 or another electronic device) connected to the external device 500 via a different connector 50. While connected by the connectors 50 to the external device 500, the head-mountable device 100 and the head-mountable device 200 can communicate with each other and be operated in concert. Accordingly, signals can be transmitted and received by each of the head-mountable device 100, the head-mountable device 200, and the external device 500 via the connectors 50.

While two head-mountable devices are illustrated in FIG. 10, it will be understood that any number of connectors 50 can connect to any number of head-mountable devices and/or other electronic devices and the external device 500. For example, two or more connectors 50 can operably connect to two or more head-mountable devices and/or other electronic devices and the external device 500. In such an arrangement, any one of the devices can transmit signals to any other device(s), and any one of the devices can receive signals from any other device(s).

Figure 11:
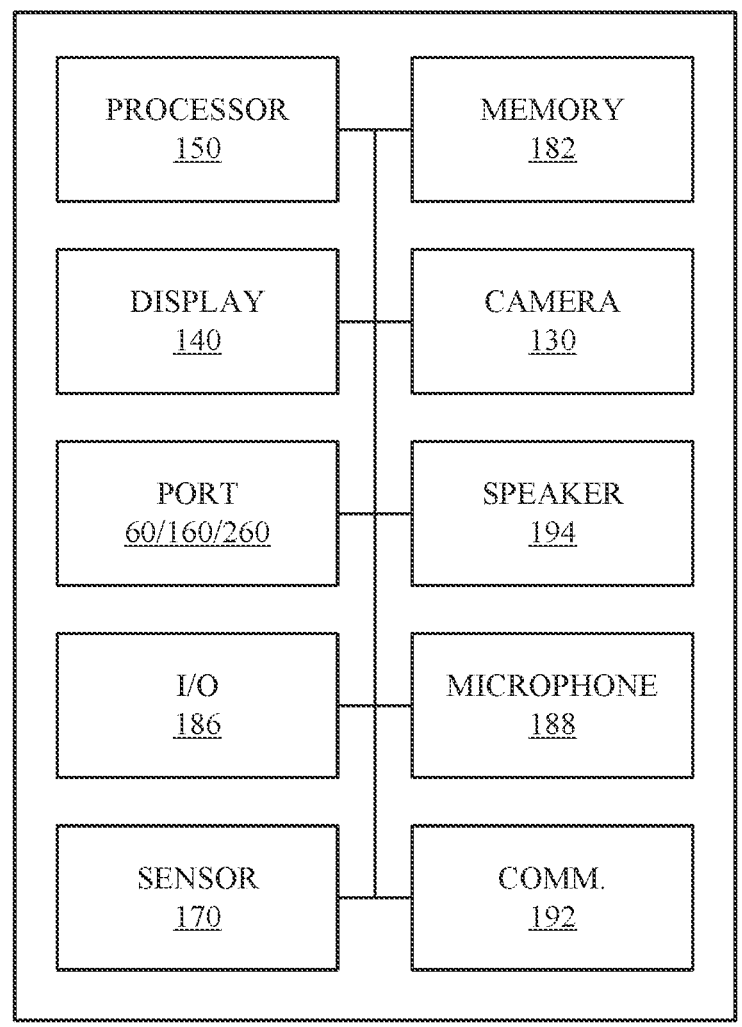
FIG. 11 illustrates a block diagram of a head-mountable device, in accordance with some embodiments of the present disclosure.

Referring now to FIG. 11, components of the head-mountable device, electronic device, and/or external device can be operably connected to provide the performance described herein. FIG. 11 shows a simplified block diagram of an illustrative head-mountable device 100, head-mountable device 200, electronic device 300, and/or external device 500 in accordance with embodiments of the present disclosure. It will be understood that additional components, different components, or fewer components than those illustrated may be utilized within the scope of the subject disclosure.

As shown in FIG. 11, the device 100, 200, 300, and/or 500 can include a processor 150 (e.g., control circuitry) with one or more processing units that include or are configured to access a memory 182 having instructions stored thereon. The instructions or computer programs may be configured to perform one or more of the operations or functions described with respect to the device 100, 200, 300, and/or 500. The processor 150 can be implemented as any electronic device capable of processing, receiving, or transmitting data or instructions. For example, the processor 150 may include one or more of: a microprocessor, a central processing unit (CPU), an application-specific integrated circuit (ASIC), a digital signal processor (DSP), or combinations of such devices. As described herein, the term "processor" is meant to encompass a single processor or processing unit, multiple processors, multiple processing units, or other suitably configured computing element or elements.

The memory 182 can store electronic data that can be used by the device 100, 200, 300, and/or 500. For example, the memory 182 can store electrical data or content such as, for example, audio and video files, documents and applications, device settings and user preferences, timing and control signals or data for the various modules, data structures or databases, and so on. The memory 182 can be configured as any type of memory. By way of example only, the memory 182 can be implemented as random access memory, read-only memory, Flash memory, removable memory, or other types of storage elements, or combinations of such devices.

The device 100, 200, 300, and/or 500 can further include a display element 140 for displaying visual information for a user. The display element 140 can provide visual (e.g., image or video) output. The display element 140 can be or include an opaque, transparent, and/or translucent display. The display element 140 may have a transparent or translucent medium through which light representative of images is directed to a user's eyes. The display element 140 may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface. The device 100, 200, 300, and/or 500 can include an optical subassembly configured to help optically adjust and correctly project the image-based content being displayed by the display element 140 for close up viewing. The optical subassembly can include one or more lenses, mirrors, or other optical devices.

The device 100, 200, 300, and/or 500 can include a connection port 160 and/or 260, as described herein.

The device 100, 200, 300, and/or 500 can include one or more sensors 170, as described herein. The device 100, 200, 300, and/or 500 can include one or more other sensors. Such sensors can be configured to sense substantially any type of characteristic such as, but not limited to, images, pressure, light, touch, force, temperature, position, motion, and so on. For example, the sensor can be a photodetector, a temperature sensor, a light or optical sensor, an atmospheric pressure sensor, a humidity sensor, a magnet, a gyroscope, an accelerometer, a chemical sensor, an ozone sensor, a particulate count sensor, and so on. By further example, the sensor can be a bio-sensor for tracking biometric characteristics, such as health and activity metrics. Other user sensors can perform facial feature detection, facial movement detection, facial recognition, eye tracking, user mood detection, user emotion detection, voice detection, etc. Sensors can include a camera which can capture image based content of the outside world.

The device 100, 200, 300, and/or 500 can include an input/output component 186, which can include any suitable component for connecting device 100, 200, 300, and/or 500 to other devices. Suitable components can include, for example, audio/video jacks, data connectors, or any additional or alternative input/output components. The input/output component 186 can include buttons, keys, or another feature that can act as a keyboard for operation by the user.

The device 100, 200, 300, and/or 500 can include the microphone 188 as described herein. The microphone 188 can be operably connected to the processor 150 for detection of sound levels and communication of detections for further processing, as described further herein.

The device 100, 200, 300, and/or 500 can include speakers 194. The speakers 194 can be operably connected to the processor 150 for control of speaker output, including sound levels, as described further herein.

The device 100, 200, 300, and/or 500 can include communications circuitry 192 for communicating with one or more servers or other devices using any suitable communications protocol. For example, communications circuitry 192 can support Wi-Fi (e.g., a 802.11 protocol), Ethernet, Bluetooth, high frequency systems (e.g., 900 MHz, 2.4 GHz, and 5.6 GHz communication systems), infrared, TCP/IP (e.g., any of the protocols used in each of the TCP/IP layers), HTTP, BitTorrent, FTP, RTP, RTSP, SSH, any other communications protocol, or any combination thereof. Communications circuitry 192 can also include an antenna for transmitting and receiving electromagnetic signals.

The device 100, 200, 300, and/or 500 can include a battery or other power source, which can charge and/or power components of the device 100, 200, 300, and/or 500. The battery can also charge and/or power components connected to the device 100, 200, 300, and/or 500.

Accordingly, embodiments of the present disclosure provide a multiple head-mounted devices and/or other electronic devices that can operate in concert to provide multiple users with shared experiences and content enjoyment. Such operations can be facilitated by a connection between multiple head-mounted devices and/or other electronic devices to allow different users to receive content. Such a connection can be made possible by a connector that directly and physically connects head-mounted devices and/or other electronic devices to each other and transmits signals there between. By providing a physical connection, the signals can be efficiently transmitted even when other types of connections (e.g., wireless) are not available.

Various examples of aspects of the disclosure are described below as clauses for convenience. These are provided as examples, and do not limit the subject technology.

Clause A: a system comprising: a head-mountable device: a first display element; and a first connection port configured to output a signal corresponding to a first image provided on the first display element; an electronic device comprising: a second display element; and a second connection port; and a connector comprising: a first end configured to be received by the first connection port of the head-mountable device; a second end configured to be received by the second connection port of the electronic device; and a controller configured to receive the signal from the first connection port of the head-mountable device and output a modified signal to the electronic device at the second end, wherein the electronic device is configured to provide a second image on the second display element based on the modified signal.

Clause B: a head-mountable device comprising: a camera; a display element; a sensor; a connection port for receiving an end of a connector; and a processor configured to: capture an image with the camera; detect a condition with the sensor; transmit, to an electronic device via the connection port and the connector, a signal indicating the image and the condition, the electronic device being configured to display the image and a visual feature corresponding to the condition.

Clause C: a head-mountable device comprising: a camera; a display element; a connection port for receiving an end of a connector; and a processor configured to: capture an image with the camera; transmit, to an electronic device via the connection port and the connector, a first signal indicating the image for display by the electronic device; and receive, from the electronic device via the connection port and the connector, a second signal indicating a user input provided to the electronic device; output, on the display element, a visual feature corresponding to the user input.

One or more of the above clauses can include one or more of the features described below. It is noted that any of the following clauses may be combined in any combination with each other, and placed into a respective independent clause, e.g., clause A, B, or C.

Clause 1: the head-mountable device is a first head-mountable device and further comprises: a first head securement element; a first camera; a first microphone; and a first speaker; and the electronic device is a second head-mountable device and further comprises: a second head securement element; a second camera; a second microphone; and a second speaker.

Clause 2: the signal further corresponds to a first output of the first speaker of the first head-mountable device; and the second head-mountable device is configured to provide a second output with the second speaker based on the modified signal.

Clause 3: the signal is based on a characteristic of the first display element; and the modified signal is based on a characteristic of the second display element.

Clause 4: the controller is configured to detect the characteristic of the first display element and the characteristic of the second display element.

Clause 5: the modified signal has a different sampling rate with respect to the signal.

Clause 6: the sensor comprises a touch sensor.

Clause 7: a location of the visual feature on the image corresponds to a touch location detected by the touch sensor.

Clause 8: the sensor comprises an eye-tracking sensor.

Clause 9: a location of the visual feature on the image corresponds to a gaze location detected by the eye-tracking sensor.

Clause 10: the display element is configured to display a first portion of the image based on an orientation of the head-mountable device; and the electronic device is configured to display a second portion of the image based on a user input received at the electronic device.

Clause 11: the electronic device is an additional head-mountable device and further comprises: an additional camera; and an additional display element.

As described above, one aspect of the present technology may include the gathering and use of data available from various sources. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In another example, users can select not to provide mood-associated data for targeted content delivery services. In yet another example, users can select to limit the length of time mood-associated data is maintained or entirely prohibit the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the invention. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order.

It should be understood that the described instructions, operations, and systems can generally be integrated together in a single software/hardware product or packaged into multiple software/hardware products.

In one aspect, a term coupled or the like may refer to being directly coupled. In another aspect, a term coupled or the like may refer to being indirectly coupled.

Terms such as top, bottom, front, rear, side, horizontal, vertical, and the like refer to an arbitrary frame of reference, rather than to the ordinary gravitational frame of reference. Thus, such a term may extend upwardly, downwardly, diagonally, or horizontally in a gravitational frame of reference.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language of the claims and to encompass all legal equivalents. Notwithstanding, none of the claims are intended to embrace subject matter that fails to satisfy the requirements of the applicable patent law, nor should they be interpreted in such a way.

What is claimed is:

1. A head-mountable device comprising:
   a camera;
   a first display element;
   a connection port for communicating with an electronic device; and
   a processor configured to:
   capture an image with the camera;
   transmit, to the electronic device via the connection port, a first signal indicating the image for display on a second display element of the electronic device; and
   receive, from the electronic device via the connection port, a second signal indicating a user input provided to the electronic device at the second display of the electronic device and detected with a touch sensor of the electronic device while the image is output on the second display element;
   output, on the first display element, a visual feature corresponding to the user input, wherein a location of the visual feature on the image while the image is output on the first display element corresponds to a touch location of the user input detected by the touch sensor while the image is output on the second display element.

2. The head-mountable device of claim 1, wherein:
   the first display element is configured to display a first portion of the image based on an orientation of the head-mountable device; and
   the electronic device is configured to display a second portion of the image based on the user input received at the electronic device.

3. The head-mountable device of claim 1, wherein the electronic device is an additional head-mountable device and further comprises
   an additional camera.

4. The head-mountable device of claim 3, wherein the additional head-mountable device is configured to detect an additional user input with an eye-tracking sensor.

5. The head-mountable device of claim 4, wherein the location of the visual feature on the image further corresponds to a gaze location detected by the eye-tracking sensor.

6. A system comprising:
   a head-mountable device comprising:
      a camera configured to capture an image; and
      a first display element configured to output the image; and
      a first connection port configured to output a first signal corresponding to the image; and
   an electronic device comprising:
      a second connection port configured to receive the first signal;
      a second display element configured to output the image; and
      a touch sensor configured to detect a user input provided at the second display element while the image is output on the second display element, wherein the second connection port configured to transmit a second signal indicating the user input provided to the electronic device,
   wherein the first display element is further configured to output a visual feature corresponding to the user input, wherein a location of the visual feature on the image while the image is output on the first display element corresponds to a touch location of the user input detected by the touch sensor while the image is output on the second display element.

7. The system of claim 6, wherein:
   the head-mountable device further comprises:
      a first head securement element;
      a first microphone; and
      a first speaker; and
   the electronic device further comprises:
      a second microphone; and a second speaker.

8. The system of claim 6, wherein:
the first display element is configured to display a first portion of the image based on an orientation of the head-mountable device; and
the electronic device is configured to display a second portion of the image based on the user input received at the electronic device.

9. The system of claim 6, wherein the electronic device is an additional head-mountable device and further comprises an additional camera.

10. The system of claim 9, wherein the additional head-mountable device is configured to detect an additional user input with an eye-tracking sensor.

11. The system of claim 10, wherein the location of the visual feature on the image further corresponds to a gaze location detected by the eye-tracking sensor.

12. An electronic device comprising:
a first display element;
a touch sensor;
a connection port for communicating with a head-mountable device; and
a processor configured to:
receive, from the head-mountable device and via the connection port, a first signal indicating an image for display on the first display element of the electronic device, the image being captured by a camera of the head-mountable device; and
detect, with the touch sensor, a user input provided at the first display element of the electronic device while the image is output on the first display element;
transmitting, to the head-mountable device and via the connection port, a second signal indicating the user input provided to the electronic device for output of a visual feature corresponding to the user input on the second display of the head-mountable device, wherein a location of the visual feature on the image while the image is output on a second display element of the head-mountable device corresponds to a touch location of the user input detected by the touch sensor while the image is output on the first display element.

13. The electronic device of claim 12, wherein:
the first display element is configured to display a first portion of the image based on an orientation of the head-mountable device; and
the electronic device is configured to display a second portion of the image based on the user input received at the electronic device.

14. The electronic device of claim 12, wherein the electronic device is an additional head-mountable device and further comprises an additional camera.

15. The electronic device of claim 14, wherein the additional head-mountable device is configured to detect an additional user input with an eye-tracking sensor.

16. The electronic device of claim 15, wherein the location of the visual feature on the image further corresponds to a gaze location detected by the eye-tracking sensor.

* * * * *